Patented Sept. 13, 1949

2,481,545

UNITED STATES PATENT OFFICE 2,481,545

DRILLING FLUIDS AND METHODS OF USING THE SAME

Cary R. Wagner, Utica, Ohio, and Martin A. Ryan, Bartlesville, Okla., assignors to Phillips Petroleum Company, a corporation of Delaware No Drawing. Application August 11, 1947, Serial No. 768,070

9 Claims. (Cl. 252—8.5)

This invention relates to alkaline water base drilling muds containing alkali soluble aluminum carboxyalkylcellulose.

In the art of drilling wells by the rotary method, it is necessary to use a drilling mud, as is well understood in the art. This drilling mud must carry the cuttings to the surface, create a back pressure to prevent collapse of the walls and form a difficultly permeable film or cake on the walls of the well to prevent the loss of at least any substantial amount of water from the drilling mud to the natural formations which the well penetrates.

A satisfactory drilling mud must have the lowest viscosity consistent with the capacity for carrying away rock particles. It must have suitable gel properties or thixotropy so that the heavy particles held in the stream do not settle out when the pump is stopped. These desired properties can be imparted to natural muds by the addition of small amounts of alkali soluble aluminum carboxyalkylcelluloses.

In drilling wells, there are major difficulties caused by natural formations penetrated. One difficulty is presented when formations known as heaving shales are penetrated. These heaving shales absorb water from the drilling mud and by a caving or disintegrating action common to clay and shale, or by a swelling action common to bentonite materials, the well hole is closed around the drill string, choking off the circulation of drilling mud and seizing the drill string so that the drill string twists in half.

The encountering of salt presents another difficulty. Salt will cut drilling mud so that its viscosity is entirely too high, the clay particles are flocculated, and there is grave danger of the drilling pipe twisting in half, or of gas cutting the mud and of a blowout due to this cutting of the mud.

The principal object of our invention is to produce a drilling mud which can be used, not only in ordinary formations, but which will resist contamination by salt and which will not cause heaving shale or like formations to cave or swell.

Another object is to provide an improved drilling mud.

Another object is to provide a drilling mud containing in combination an alkaline water soluble aluminum carboxyalkylcellulose and sufficient clayey material to form a filter cake on the wall of the well.

Numerous other objects and advantages of this invention will be apparent to those skilled in the art upon reading the following specification and the accompanying claims.

OPERATIONS

In the present invention, we prefer to employ as a colloidal suspending agent or dispersing agent an alkaline water soluble aluminum carboxyalkylcellulose of the group consisting of aluminum carboxymethylcellulose and aluminum carboxyethylcellulose. Methods for preparing carboxyethylcellulose are set forth in U. S. Patents 2,332,048 (1943) and 2,349,797 (1944). The amount of such agent used is not critical as even small amounts give correspondingly small effects. We prefer to use it in the ratio of about two pounds of air dried aluminum carboxyalkylcellulose per forty-two gallon barrel of mud. Below 0.25 of a pound per barrel the treating effect is generally too small. If the amount is increased very much above about four pounds per barrel, in most instances, the ten minute gel strength becomes too high for proper circulation with the well pumps. We prefer to use from 0.5 to three pounds per barrel. The amount used depends on the nature of the earth formations being encountered in drilling. Because of differences in degradation of the cellulose employed and differences in natural formations encountered, we prefer to give functional rather than numerical limits.

We prefer to use the air dried material powdered so that it will pass an 80 mesh screen. It is put into solution by dissolving it in an alkaline solution of pH 8.0 to 9.0 and said solution is added to the mud. The dry powder may, however, be incorporated directly into the mud and the pH of the mud adjusted with caustic, either before or after such incorporation. The method of adding the aluminum carboxyalkylcellulose is not critical.

The use of aluminum carboxyalkylcellulose, to be retained as a soluble dispersing agent throughout the entire normal life of drilling mud, is not to be confused with the use of some alkaline or acid soluble cellulose which is to be precipitated as an insoluble plugging agent in the formation.

The mode or theory of operation by which the alkali soluble aluminum carboxyalkylcelluloses protect the surface of the bentonite from attack by water is obscure, but it is believed that as the water attempts to enter the clay, the alkali soluble aluminum carboxyalkylcellulose forms a layer of protective material on the outside of the clay or bentonite, preventing the clay or bentonite from absorbing the water from the drilling mud.

Drilling muds containing alkali soluble aluminum carboxyalkylcellulose are not subject to injury by salt to any detrimental degree.

Drilling muds containing alkali soluble aluminum carboxyalkylcellulose often have less initial gel strength, which allows gas bubbles to come out of the drilling mud so rapidly that the mud will not tend to become gas cut. Reduction of gas cutting reduces the chances of blowouts. Alkali soluble aluminum carboxyalkylcellulose drilling muds are characterized by very thin filter cake thickness. This is very useful in avoiding loss of water to the formation and the resultant swelling or caving of the formation which occurs with some formations.

Drilling muds containing aluminum carboxyalkylcelluloses do not generally ferment or spoil.

Numerous other advantages of alkali soluble aluminum carboxyalkylcellulose drilling muds will be apparent from a study of the following representative tests, which have been selected to show, in a minimum of space, the advantages of alkali soluble aluminum carboxyalkylcellulose drilling muds.

EXAMPLE A

The aluminum salt of carboxymethylcellulose can be prepared as follows:

A saturated solution of aluminum sulfate is added, with constant stirring, to a filtered, water solution of sodium carboxymethylcellulose. A white precipitate of aluminum carboxymethylcellulose is formed and the pH of the solution is found to be reduced from about 8.5 to 4.5. The precipitates formed, being water insoluble, are washed with water until the filtrates are free of sulfates, then air dried and ground to pass an 80 mesh Tyler screen. Three samples are prepared in this manner, two duplicate samples starting with a low viscosity sodium salt of carboxymethylcellulose and one sample from a medium viscosity sodium salt of carboxymethylcellulose. Both the low and medium viscosity sodium salts have a 0.7 to 0.8 degree of substitution. One of the aluminum salts prepared is ashed to give 6.39% aluminum oxide. This figure calculates out as a degree of substitution of approximately 1. The loss in weight of the air dried products upon heating at 105° C. is about 14.9%.

Other methods of preparation may be employed provided a like alkaline water soluble aluminum carboxyalkylcellulose is obtained.

EXAMPLE B

Tests were carried out using the aluminum carboxymethylcellulose with a low calcium, fresh water mud designated as EB-10-F mud. This mud contained Ezmix, a native Texas clay, and bentonite in the weight ration of 10 to 1 and was treated with barium carbonate to reduce the high soluble calcium content resulting from the use of Ezmix. Two batches of mud containing 11% clay and 12% clay, respectively, were used in the various tests. Barium sulfate was added to bring the weight up to about 11#/gal. The properties of these two batches were:

TABLE I

| | 11% Clay | 12% Clay |
|---|---|---|
| Mud Weight, lbs. per gal | 11.2 | 11.2 |
| Viscosity, cps | 17 | 24 |
| Initial Gel Strength, g | 25 | 45 |
| 10 Minute Gel Strength, g | 35 | 57 |
| Water Loss, ml. in 30 min., 100 p. s. i. | 29 | 23 |
| pH | 8.7 | 9 |
| Soluble Ca (P. P. M. as CaCO₃ by soap hardness test) | 34 | 68 |

EXAMPLE C

Dosages of the air dried samples of aluminum carboxymethylcellulose equivalent to 1, 2, and 3 pounds air dried aluminum carboxymethylcellulose per barrel of mud (0.85, 1.7, and 2.55 pounds of dry aluminum carboxymethylcellulose per barrel of mud respectively) were stirred into the low calcium EB-10-F mud and allowed to stand overnight before testing. The properties tested were pH, water loss, viscosity, initial gel strength, and 10 minute gel strength, the test procedures followed being those outlined in API Code 29. In this and the following examples, for the sake of brevity, aluminum carboxymethylcellulose is abbreviated "Al CMC." This is not the chemical formula for aluminum carboxymethylcellulose nor is it to be taken as representing any empirical relationship. The results are shown in the following tables:

TABLE II

*The effect of low viscosity Al CMC on EB-10-F low calcium mud containing 12% clay*

| | | | | |
|---|---|---|---|---|
| Al CMC, lbs. per bbl | 0 | 0.85 | 1.71 | 2.55 |
| Mud weight, lbs. per gal | 11.2 | ---- | ---- | ---- |
| Viscosity, cps | 24 | 22 | 49 | 96 |
| Initial gel strength, g | 45 | 2 | 15 | 25 |
| 10 min. gel strength, g | 57 | 60 | 85 | 190 |
| Water loss, ml. in 30 min | 23 | 11 | 7.3 | 5.5 |
| pH | 9 | 8.6 | 8.6 | 8.5 |
| Soluble Ca (P. P. M. as CaCO₃) | 68 | ---- | ---- | ---- |

TABLE III

*The effect of low viscosity Al CMC on EB-10-F low calcium mud containing 11% clay*

| | | | | |
|---|---|---|---|---|
| Al CMC, lbs. per bbl | 0 | 0.85 | 1.71 | 2.55 |
| Mud weight, lbs. per gal | | | | |
| Viscosity, cps | 17 | 22 | 49 | 103 |
| Initial gel strength, g | 25 | 1 | 9 | 37 |
| 10 min. gel strength, g | 35 | 20 | 70 | 300 |
| Water loss, ml. in 30 min | 29 | 11 | 8 | 6.5 |
| pH | 8.7 | 8.3 | 8.3 | 8.3 |
| Soluble Ca (P. P. M. as CaCO₃) | 34 | | | |

TABLE IV

*The effect of medium viscosity Al CMC on EB-10-F low calcium mud containing 11% clay*

| | | | |
|---|---|---|---|
| Al CMC, lbs. per barrel | 0 | 0.85 | ¹ 1.71 |
| Mud Weight, lbs. per gal | | | |
| Viscosity, cps | 17 | 47.5 | 150 |
| Initial gel strength, g | 25 | 12 | 100 |
| 10 min. gel strength, g | 35 | 130 | 450 |
| Water loss, ml. in 30 min | 29 | 10 | 6.5 |
| pH | 8.7 | 7.8 | 7.8 |
| Soluble Ca (P. P. M. as CaCO₃) | 3.4 | | |

¹ Plus 1#/bbl sodium acid pyrophosphate.

By comparison with aluminum carboxymethylcellulose, aluminum carboxyethylcellulose is as good (or better) with respect to the water loss property and gel strength effects. In low and high calcium fresh water muds, aluminum carboxyethylcellulose imparts better viscosity properties, while aluminum carboxymethylcellulose is superior for use with salt water mud in this respect.

The use of the materials as mentioned above is not to be confused with the use of some other degraded, heterogeneous, oxidized cellulose soluble only in 2N (8%) caustic soda solutions, or more strongly alkaline solutions, which is to be precipitated in large quantities as an insoluble plugging agent upon dilution with water. Such materials which are readily precipitable upon dilution with water are too difficult to handle to employ as well drilling fluids. They are too expensive because of loss of precipitated material, and the precipitated material fills the mud pit, causes choking of the drill string and filling of the bore hole in some instances.

It will be noted that the EB-10-F low calcium mud in Table I has a water loss of over 23 ml. in 30 min. An alkaline water solution of 2 pounds per barrel of aluminum carboxymethylcellulose or aluminum carboxyethylcellulose has a complete water loss, as all of it will pass a No. 52 Whatman filter paper in less than one minute under the same standard test conditions. Yet the combination of the two, as shown in Table II above, results in suitable, reduced water losses of 11 ml. or less in 30 minutes. A combination, therefore, exists between the suspended solids, or clay particles, and the aluminum carboxyalkylcelluloses. Finely ground weighting agents such as barium sulfate in powdered form make a similar low water loss drilling mud with aluminum carboxyalkylcelluloses.

The usual treating agents, such as caustic soda, phosphates, and quebracho, may be used without difficulty. The usual amounts of weighting agents, such as barium sulfate, may be supported by alkaline water base aluminum carboxyalkylcellulose drilling muds. The above examples are merely representative and various obvious changes may be made in practicing the invention, which is defined only by the following claims.

Having fully described our invention, we claim:

1. In a process of drilling wells comprising the steps of drilling the well with well drilling tools, and circulating through the well during said drilling an alkaline water base drilling mud having a pH of 7.8 or greater which forms a filter cake on the wall of the well, the improvement comprising incorporating in said drilling mud an alkali soluble aluminum carboxyalkylcellulose selected from the group consisting of aluminum carboxymethylcellulose and aluminum carboxyethylcellulose in an amount sufficient to reduce water loss due to filtration through said filter cake but insufficient to increase the viscosity of said drilling mud to such an extent that it cannot be circulated.

2. An alkaline water base well drilling mud having a pH of 7.8 or greater comprising in combination sufficient water to maintain the mud as a fluid, sufficient clayey material to form a filter cake on the wall of the well, and an alkali soluble aluminum carboxyalkylcellulose selected from the group consisting of aluminum carboxymethylcellulose and aluminum carboxyethylcellulose in an amount sufficient to reduce the water loss due to filtration through said filter cake without increasing the viscosity of said well drilling mud to such an extent that it cannot be circulated.

3. An alkaline water base well drilling mud having a pH of 7.8 or greater comprising an aqueous fluid mixture containing suspended solids which form a filter cake on the wall of the well, and an alkali soluble aluminum carboxyalkylcellulose selected from the group consisting of aluminum carboxymethylcellulose and aluminum carboxyethylcellulose in an amount sufficient to reduce the water loss due to filtration through said filter cake without increasing the viscosity of the said well drilling mud to such an extent that it cannot be circulated.

4. In a process of drilling wells comprising the steps of drilling the well with well drilling tools, and circulating through the well during said drilling an alkaline water base drilling mud having a pH of 7.8 or greater which forms a filter cake on the wall of the well, the improvement comprising incorporating in said drilling mud an alkali soluble aluminum carboxymethylcellulose in an amount sufficient to reduce the water loss due to filtration through said filter cake but insufficient to increase the viscosity of said drilling mud to such an extent that it cannot be circulated.

5. An alkaline water base well drilling mud having a pH of 7.8 or greater comprising in combination sufficient water to maintain the mud as a fluid, sufficient clayey material to form a filter cake on the wall of the well, and an alkali soluble aluminum carboxymethylcellulose in an amount sufficient to reduce the water loss due to filtration through said filter cake without increasing the viscosity of said well drilling mud to such an extent it cannot be circulated.

6. An alkaline water base well drilling mud having a pH of 7.8 or greater comprising an aqueous fluid mixture containing suspended solids which form a filter cake on the wall of the well, and an alkali soluble aluminum carboxymethylcellulose in an amount sufficient to reduce the water loss due to filtration through said filter cake without increasing the viscosity of the said well drilling mud to such an extent that it cannot be circulated.

7. In a process of drilling wells comprising the steps of drilling the well with well drilling tools, and circulating through the well during said drilling an alkaline water base drilling mud having a pH of 7.8 or greater which forms a filter cake on the wall of the well, the improvement comprising incorporating in said drilling mud an alkali soluble aluminum carboxyethylcellulose in an amount sufficient to reduce the water loss due to filtration through said filter cake but insufficient to increase the viscosity of said drilling mud to such an extent that it cannot be circulated.

8. An alkaline water base well drilling mud having a pH of 7.8 or greater comprising in combination sufficient water to maintain the mud as a fluid, sufficient clayey material to form a filter cake on the wall of the well, and an alkali soluble aluminum carboxyethylcellulose in an amount sufficient to reduce the water loss due to filtration through said filter cake without increasing the viscosity of said well drilling mud to such an extent that it cannot be circulated.

9. An alkaline water base well drilling mud having a pH of 7.8 or greater comprising an aqueous fluid mixture containing suspended solids which form a filter cake on the wall of the well, and an alkali soluble aluminum carboxyethylcellulose in an amount sufficient to reduce the water loss due to filtration through said filter cake without increasing the viscosity of the said well drilling mud to such an extent that it cannot be circulated.

CARY R. WAGNER.
MARTIN A. RYAN.

REFERENCES CITED

The following references are of record in the file of this patent:

UNITED STATES PATENTS

| Number | Name | Date |
| --- | --- | --- |
| 2,129,913 | Cross et al. | Sept. 13, 1938 |
| 2,425,768 | Wagner | Aug. 19, 1947 |